4,088,390

United States Patent [19]
McCartney

[11] 4,088,390
[45] May 9, 1978

[54] SINGLE OPTICAL FIBER CONNECTOR
[75] Inventor: Ronald L. McCartney, Orange, Calif.
[73] Assignee: International Telephone and Telegraph Corporation, New York, N.Y.
[21] Appl. No.: 682,274
[22] Filed: May 3, 1976

Related U.S. Application Data
[63] Continuation-in-part of Ser. No. 629,004, Nov. 5, 1975, abandoned.

[51] Int. Cl.² ............................................. G02B 5/14
[52] U.S. Cl. ................................................ 350/96.21
[58] Field of Search .................................... 350/96 C

[56] References Cited
U.S. PATENT DOCUMENTS

| | | | |
|---|---|---|---|
| 3,936,145 | 2/1976 | McCartney | 350/96 C |
| 3,947,182 | 3/1976 | McCartney | 350/96 C |
| 3,948,582 | 4/1976 | Martin | 350/96 C |
| 3,972,585 | 8/1976 | Dalgleish et al. | 350/96 C |
| 4,008,948 | 2/1977 | Dalgleish et al. | 350/96 C |

Primary Examiner—John K. Corbin
Assistant Examiner—Rolf Hille
Attorney, Agent, or Firm—T. L. Peterson

[57] ABSTRACT

A heremaphroditic connector for coupling a pair of single optical fibers is disclosed. The connector comprises a pair of connector members each containing at least one single optical fiber terminated by a termination pin. The pin includes a metal eyelet crimped about the optical fiber in three places providing three, spaced, curved indentations which centrally position the fiber in the pin. When the connector members are mated, the mating termination pins are positioned so that the indentations therein are generally aligned. A cam or spring device is forced into the indentations in the mating termination pins to accurately laterally align the pins and, hence, the optical fibers therein.

35 Claims, 14 Drawing Figures

SINGLE OPTICAL FIBER CONNECTOR

CROSS REFERENCE TO RELATED APPLICATION

This application is a continuation-in-part of my copending application, Ser. No. 629,004, filed Nov. 5, 1975, now abandoned.

BACKGROUND OF THE INVENTION

The present invention relates generally to a connector and, more specifically, to an optical coupler for single fiber optic cables.

The employment of fiber optic cables or light guides, also sometimes referred to as optical communication fibers, for the transmission of information-bearing light signals, is now an established art. Much development work has been devoted to the provision of practical low-loss glass materials and production techniques for producing glass fiber cables with protective outer claddings or jackets. The jackets make them resemble ordinary metallic-core electrical cable upon superficial external inspection. Obviously, if fiber optic cables are to be used in practical signal transmission and processing systems, practical connectors for the connection and disconnection of fiber optic cables must be provided.

Some references will now be given for background in the state of fiber optic art in general. An article entitled, "Fiber Optics", by Narinder S. Kapany, published in *Scientific American*, Vol. 203, pgs. 72–81, November 1960, provides a useful background in respect to some theoretical and practical aspects of fiber optic transmission.

Of considerable relevance to the problem of developing practical fiber optic connectors, is the question of transfer efficiency at the connector. Various factors, including separation at the point of abutment, and lateral separation or axial misalignment, are among the factors effecting the light transfer efficiency at a connector. In this connection, attention is directed to the *Bell System Technical Journal*, Vol. 50, No. 10, December 1971, specifically to an article by D. L. Bisbee, entitled, "Measurement of Loss Due to Offset, and End Separations of Optical Fibers". Another *Bell System Technical Journal* article of interest appeared in Vol. 52, No. 8, October 1973, and was entitled, "Effect of Misalignments on Coupling Efficiency on Single-Mode Optical Fiber But Joints", by J. S. Cook, W. L. Mammel and R. J. Grow.

Fiber optic bundles are normally utilized for only short transmission distances in fiber optic communications networks. On the other hand, fibers are used individually as optical data channels to allow transmission over many kilometers. At present, most fiber optic cables are multi-fiber bundles due to the less stringent splicing requirements, greater inherent redundancy and higher signal-to-noise ratio. The difficulty in achieving connections between single fibers which are insensitive to axial misalignment problems has created an obstacle to the use of long run single data transmission systems.

Therefore, a connector or coupler is required to eliminate lateral tolerances if low-loss connections are to be obtained in the use of single fiber optical transmission arrangements. "V" groove and metal sleeve arrangements have been used to interconnect single fibers. Reference is made to U.S. Pat. No. 3,768,146 which discloses a metal sleeve interconnection for single fibers.

Another known device, as shown in U.S. Pat. No. 3,734,594, utilizes a deformable annular core having pressure plates at the ends. The fiber ends are inserted into the core and an axial force is applied to the plates to deform the core radially, thereby aligning and securing the fibers.

These prior devices, however, do not readily provide sufficient accuracy for joining and aligning small diameter cores of optical fibers.

Copending application of Charles K. Kao entitled, "Precision Optical Fiber Connector", Ser. No. 613,390, filed Sept. 15, 1975, now U.S. Pat. No. 4,047,796 assigned to the assignee of the present application, discloses a single optical fiber connector in which the ends of mating fibers are precisely aligned and coupled together in the interstice between three like contacting cylindrical rods. The rods are mounted along and around the fibers within an adjustable connector assembly. Means is provided for expanding the interstice to insert the fiber ends and for clamping the rods in position around the fibers. Copending application of Charles K. Kao entitled, "Precision Surface Optical Fiber", Ser. No. 629,210, filed concurrently herewith, now U.S. Pat. No. 4,057,322 assigned to the assignee of the present application, discloses an optical fiber in which the plastic cladding thereof is formed with three rounded indentations along its surface and a thin metal ferrule is formed around the cladding at the mating end of the fiber. A pair of such fibers may be aligned in a three rod arrangement of the type mentioned above.

The purpose of the present invention is to provide a separable connector assembly which will provide a controlled accurate alignment of mating optical fiber termination pins in a manner which minimizes light transmission losses, and is practical for commercial field use.

SUMMARY OF THE INVENTION

According to the principal aspect of the present invention, there is provided a fiber optic connector for coupling a pair of single optical fibers. The connector comprises a pair of mating connector members each containing at least one single optical fiber terminated by a termination pin. The pins are axially aligned with each other when the connector members are mated. Each termination pin includes an eyelet surrounding its respective optical fiber. Each eyelet has a mating end face adapted to abut the end face of the eyelet of the mating aligned termination pin. The wall of the eyelet adjacent to the end face embodies three circumferentially spaced indentations each disposed in juxtaposition to the fiber. Means are provided on the connector members for locating the termination pins so that the indentations in the eyelets are generally aligned when the connector members are mated thereby providing three pairs of aligned indentations. Means are also provided for effecting accurate lateral alignment between the eyelets when the connector members are mated. Such alignment means extends to opposite sides of the point of abutment of the eyelets and embodies three elements each of which extends into one pair of aligned indentations in the eyelets to align the eyelets. The alignment means may be spring elements which bias the indentations inwardly toward the fibers in the eyelets. Alternatively, the alignment means comprises two stationary edges which extend into two pairs of aligned indentations in the mating eyelets and a movable cam follower which is forced into the third pair of aligned indentations when the connector members are mated, thereby providing a positive force acting upon all three pairs of aligned indentations in the eyelets of the mating termination pins. The application of such force on the indentations brings the indentations in extremely close proximity to the fibers. Since the point of alignment of the mating eyelets is the bottoms of the indentations which are closely adjacent to the fibers, very precise lateral alignment of the fibers is achieved. Preferably, the connector members are identical so that the connector assembly is hermaphroditic which simplifies field use and servicing of the connector.

Other aspects and advantages of the invention will become more apparent from the following description taken in connection with the accompanying drawings.

DESCRIPTION OF THE PREFERRED EMBODIMENTS

The present invention is generally applicable to the interconnection of a pair of single optical fibers. The invention will be described specifically as utilizing optical fibers having a plastic cladding, such as TFE clad silica. It will be appreciated, however, that the connector of the present invention may be utilized to couple other forms of single optical fibers, with or without plastic claddings or jackets. The invention, therefore, has universal application for the coupling of single optical fibers.

Figure 1:
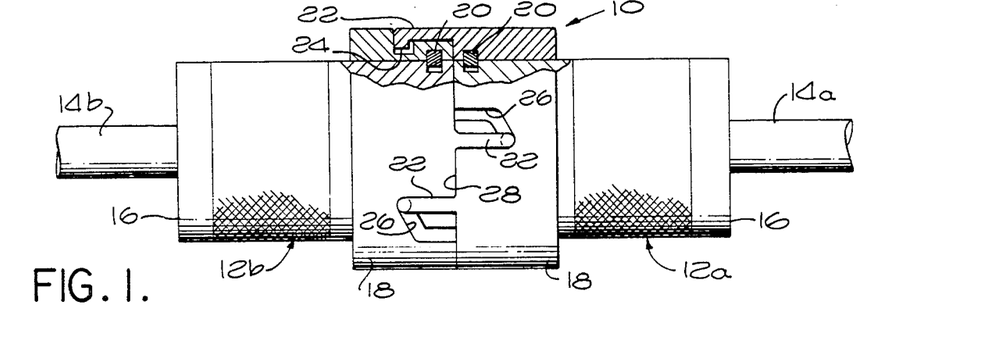
FIG. 1 is a side elevational view of the connector of the present invention in which the mating connector members of the connector are interengaged.

Referring now to FIG. 1 of the drawings in detail, there is illustrated the connector of the present invention, generally designated 10. In accordance with one feature of the invention, the connector 10 is hermaphroditic, and comprises identical mating connector members 12a and 12b. The connector members 12a and 12b terminate fiber optic cables 14a and 14b, respectively. Since the connector members 12a and 12b are identical, the same reference numerals will be utilized to designate identical parts therein. Each connector member includes a generally cylindrical shell 16 and a coupling ring 18. Each coupling ring 18 is mounted for rotation on its respective shell 16, but is prevented from axial movement thereon by means of a retaining ring 20. Each coupling ring embodies a plurality of circumferentially spaced, forwardly extending arms 22 formed with inwardly extending pins 24 at the ends of the arms. The arms are equally spaced from each other. A bayonet slots 26 are formed in each coupling ring 18 intermediate the arms 22. The slots open at the forward face 28 of the coupling ring. In order to couple the connector members 12a and 12b together, the coupling rings 18 are positioned so that the respective pins 24 on the arms 22 engage in the bayonet slots 26 so that when the rings are rotated in a clockwise direction, the shells 16 of the respective connector members will be drawn axially toward each other into full mating interengagement. While a hermaphroditic bayonet coupling arrangement has been disclosed herein, it will be appreciated that other forms of hermaphroditic coupling devices may be utilized for interconnecting the connecting members 12a and 12b.

Figure 1A:
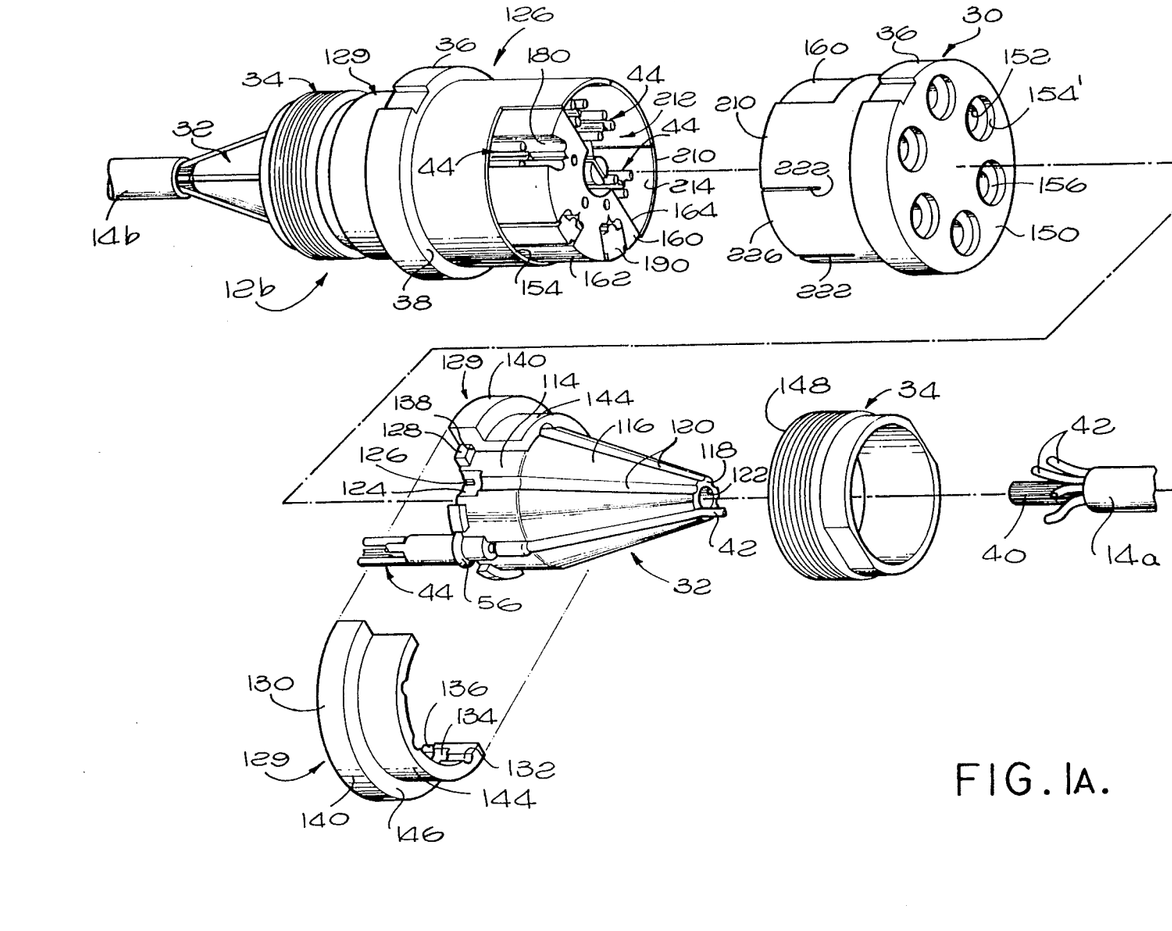
FIG. 1a is a partially exploded perspective view of the internal components of the connector members illustrated in FIG. 1.

Reference is now made to FIG. 1a of the drawings which illustrates the component parts of the mating connector members 12a and 12b. The parts of each connector member include basically a cylindrical support body 30, a fiber spreader device 32, and an externally threaded retaining ring 34. The support body has an outwardly extending annular flange 36 defining a forwardly facing annular shoulder 38. When the support body 30 is mounted in its respective connector shell 16, the shoulder 38 engages a rearwardly facing shoulder (not shown) on the interior of the shell. The spreader device 32 is mounted behind the support body 30 and is retained in the shell by the retaining ring 34, which is threaded into the rear of the shell. The specific construction of the support body 30 and spreader device 32 will be described in greater detail later.

The fiber optic cables 14a and 14b each comprises a central strength member 40 and a plurality of single optical fibers 42 disposed around the cylindrical surface of the strength member. Preferably, the fibers are plastic clad silica. However, other forms of fibers may be utilized as explained hereinbefore. Six of such fibers are incorporated in the cable disclosed herein. It will be understood that the cable may employ any number of fibers so long as there is room in the support body for mounting the termination pins for the fibers. Such pins are generally designated 44.

Figure 2:
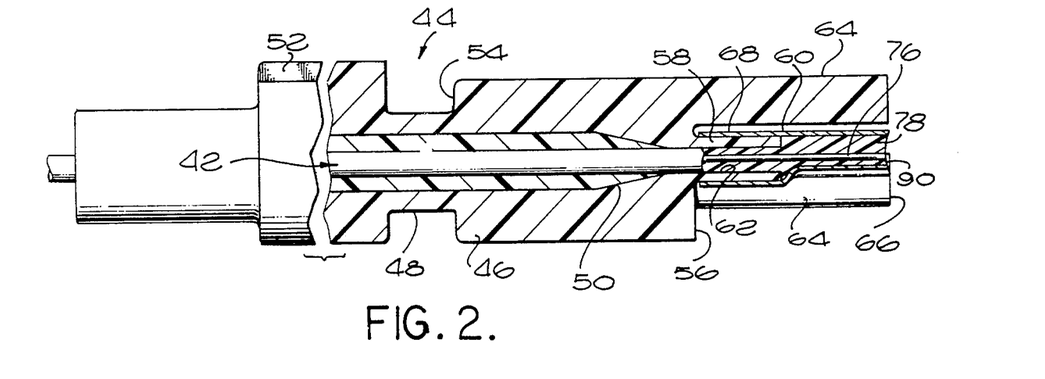
FIG. 2 is a longitudinal sectional view taken along line 2—2 of FIG. 3 through one of the termination pins employed in the connector of the present invention.
Figure 3:
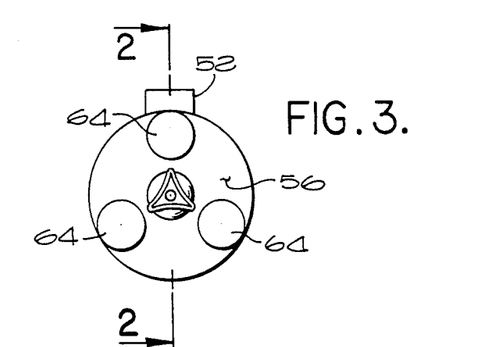
FIG. 3 is a front end view of the termination pin illustrated in FIG. 2.
Figure 4:
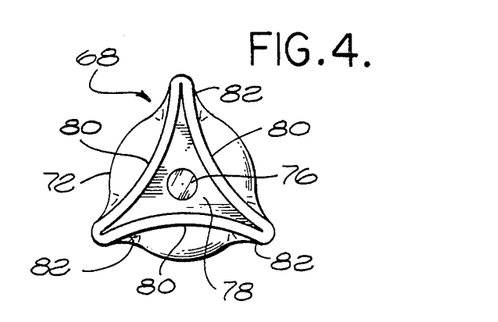
FIG. 4 is an enlarged end view of the crimped eyelet employed in the termination pin illustrated in FIGS. 2 and 3.

Reference is now made to FIGS. 2 to 4 of the drawings which illustrate in detail the structure of a termination pin 44. The termination pin comprises an elongated, generally cylindrical, plastic ferrule 46 having a central longitudinally extending passage 48 therethrough. An optical fiber 42 is mounted through the passage and is retained therein by a suitable epoxy or cement 50. The ferrule 46 is formed with a longitudinally extending key 52 and an annular groove 54 in front of the key which receives an O-ring 56, as seen in FIG. 1a.

The termination pin 44 has a forward flat face 56 (see FIG. 3). A hub 58 extends forwardly from the face 56 coaxial with the longitudinal axis of the passage 48 and terminates in an end face 60. A bore 62 in the hub extends from the end face 60 rearwardly to the passage 48. The bore has a smaller diameter than the passage and is dimensioned to slidably receive the fiber 40 therethrough. Three cylindrical posts 64 extend forwardly from the forward face 56 of the ferrule 46. The posts are spaced from the hub 58 and are equally spaced circumferentially about the forward face 56. That is, the centers of the posts are offset from each other 120°. The posts have flat forward ends 66 which lie in a common plane transverse to the axis of the ferrule 46 and forward of the end face 60 of the hub 58.

Figure 5:
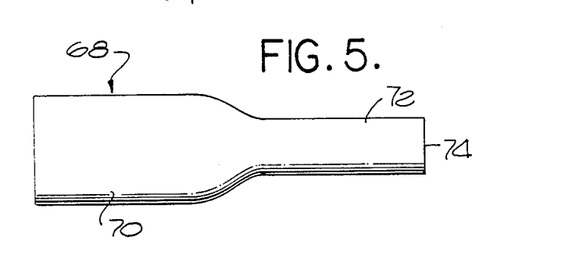
FIG. 5 is a side elevational view of the eyelet before it is crimped to the optical fiber in the termination pin.
Figure 6:
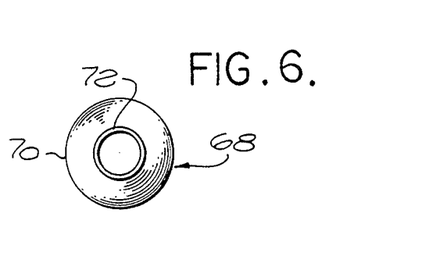
FIG. 6 is a front end view of the eyelet illustrated in FIG. 5.

A metal eyelet 68 is mounted on the hub 58 of the plastic ferrule 46. The eyelet is shown in FIGS. 5 and 6. It comprises a hollow metal sleeve having a rear, relatively large end 70 and a smaller forward end 72. The rear end 70 is dimensioned to fit over the hub 58 with an interference fit so that it will be firmly retained on the plastic ferrule. The smaller forward section 72 of the eyelet extends forwardly from the end face 60 of the hub and forward edge 74 of the eyelet is coplanar with the flat forward ends 66 of the posts 64.

The fiber 42 extends to the forward edge 74 of the eyelet. The fiber has a light transmitting core or light guide 76 and a plastic cladding 78. The forward end 72 of the metal eyelet is crimped to provide three circumferentially spaced indentations 80 and three radially outwardly extending ribs 82 as best seen in FIG. 4. The ribs and the bottoms of the indentations are spaced 120° apart. The indentations 80 have identical circular configurations. The wall of the eyelet is crimped so that the indentations are closely adjacent to the core 76 of the fiber, but not quite touching the core. If the eyelet were crimped to such an extent that the wall of the eyelet touched the core, the core may become crushed. The plastic cladding 78 of the optical fiber extrudes outwardly during the crimping operation to substantially completely fill the open space in the end of the eyelet. The indentations 80 accurately centrally locate the core 76 of the optical fiber in the eyelet and provide locating points close to the core so as to permit accurate alignment of the cores of optical fibers in mating eyelets in the connector members 12a and 12b.

The posts 64 on the plastic ferrule 46 are positioned in radial alignment outwardly from the ribs 82 of the eyelet, as seen in FIG. 3, and thus out of radial alignment with the indentations 80 in the eyelet. The posts 64 provide an enlarged abutting contact area between mating termination pins so that less pressure exists between the end faces of the eyelets 68, which might cause scratches on the faces of the cores therein, thereby producing light transmission losses.

The end of the termination pin 44 is polished to a flat surface. Since the plastic cladding 78 and fiber core 76 are softer than the metal eyelet 68, the mating end face 90 of the clad fiber becomes slightly dished during the polishing operation, as seen in FIG. 2, so that the end face of the fiber core is positioned slightly behind the forward face of the termination pin. As a consequence, when two mating pins are abutted, the cores 76 will not quite touch.

Figure 7:
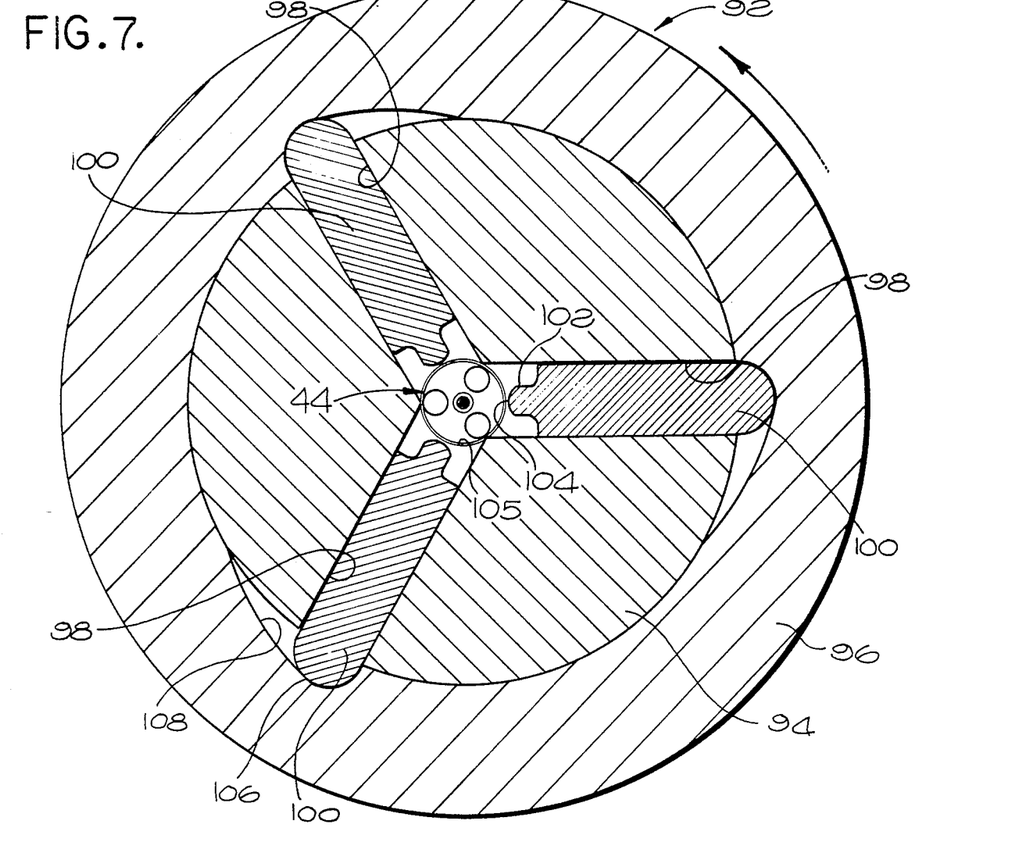
FIG. 7 is a transverse sectional view through a crimp tool utilized for crimping the eyelet to the optical fiber mounted in the termination pin illustrated in FIGS. 2 to 4.
Figure 7A:
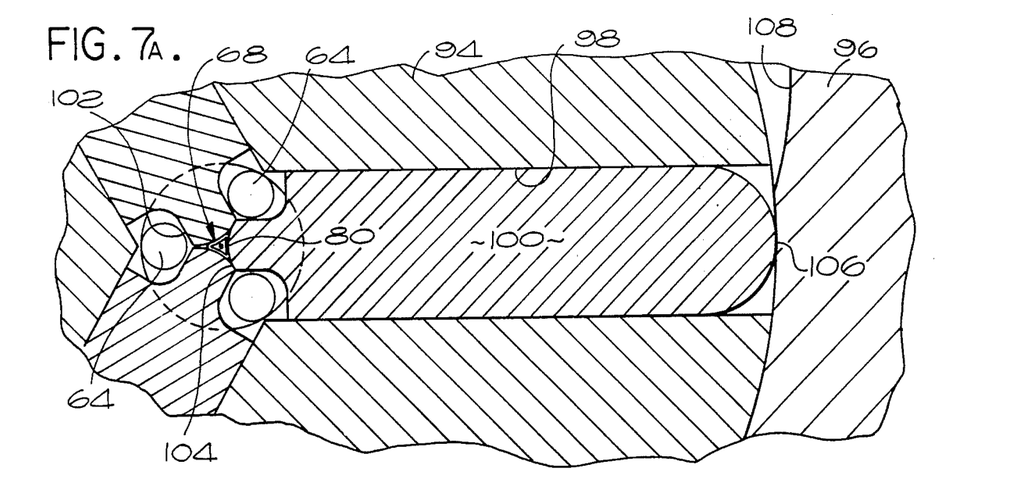
FIG. 7a is an enlarged fragmentary sectional view similar to FIG. 7 showing the crimp tool in its actuated position.

Reference is now made to FIG. 7 of the drawings which illustrates in transverse section a crimp tool for forming the indentations 80 in the eyelet 68. The tool is generally designated 92. The tool comprises an inner cylindrical body 94 surrounded by an outer ring 96, which is rotatable with respect to the body 94. Three radially extending slots 98 are formed in the body 94 offset from each other 120°. Each slot carries a crimp jaw 100. The inner end of each jaw is formed with a narrow rib 102 having an inner arcuate surface 104. A termination pin 44 is shown positioned in a center bore 105 in the body 94. It is noted that sufficient space is provided between the adjacent posts 64 on the termination pin so that the ribs 102 on the jaws may pass therethrough when the jaws are shifted radially inwardly in the slots 98. The outer ends 106 of the jaws are rounded and engage arcuate cam surfaces 108 on the ring 96. When the ring is rotated counterclockwise relative to the body 94, the jaws 100 are forced radially inwardly to the position indicated in dotted lines at 110 so that the arcuate inner surfaces 104 of the jaws will deform the eyelet 68 to form the indentations 80. It will be appreciated that the posts 64 on the ferrule 46 may have a configuration other than cylindrical (which is preferred for simplicity in the molding of plastic parts) just so the posts will not interfer with the movement of the jaws 100 in the tool 92 to crimp the eyelet 68. For example, the posts 64 may have a triangular or trapezoidal crosssection, if desired.

The fiber spreader device 32 has a generally circular forward base 114 adjacent to the cylindrical support body 30 and a rearwardly extending conical section 116 terminating in an apex 118. Six arcuate longitudinally extending grooves 120 are formed in the outer surface of the base 114 and the conical section 116 of the spreader device. The grooves are equally spaced circumferentially about the spreader device and are dimensioned to slidably receive the optical fibers 42 of the fiber optic cable. A longitudinally extending passage 122 extends from the front face of the spreader device 32 rearwardly to the apex 118 coaxial with the circular base 114. The passage 122 receives the central strength member 40 of the fiber optic cable. Circular recesses 124 are formed in the outer surface of the circular base 114 of the spreader device in alignment with the grooves 120. The termination pins 44 connected to the fibers 42 of the fiber optic cable are positioned in the recesses 124 with the keys 52 of the pins located in keyways 126 in the recesses for locating the indentations 80 in the eyelets 68 of the mating pins in general alignment when the connector members 12a and 12b are interengaged. Outwardly extending arcuate flanges 128 are formed on the circular base 114 adjacent to its forward face. A termination pin retainer ring, generally designated 129, is mounted on the circular base 114 of the spreader device 32. The ring comprises two half-ring sections 130. Each half-ring section embodies three rearwardly extending grooves 132 and forwardly extending recesses 134 complementary to the grooves 120 and recesses 124 for positioning the termination pins 44 and optical fibers 42 on the spreader. Each half-ring section 130 is formed with an arcuate groove 136 at its forward inner edge defining a forwardly facing shoulder 138 which engages the flanges 128 on the circular base 114 of the spreader. The outer diameter of the forward section 140 of the retainer ring 129 is approximately equal to the diameter of the rear flange 36 on support body 30 and the rear section 144 of the ring has a smaller diameter than the forward section defining therebetween a rearwardly facing annular shoulder 146. The retaining ring 34 is dimensioned to slide over the rear section 144 of the retainer ring 129 with its forward end 148 abutting the shoulder 146 on the ring 129. Thus, when the retaining ring 34 is threaded into the rear of the shell 16 of its respective connector member, it exerts a forwardly directed axial force on the shoulder 146. Since the shoulders 138 on the forward inner edges of the half-ring sections 130 engage the flanges 128 on the spreader device 32, the device is pressed up against the rear face 150 of the support body 30 in the shell.

The support body contains a circular array of six longitudinal bores 152 which extend from the rear face 150 of the support body to the forward face 154 thereof. The bores are circumferentially spaced apart 60° from each other in support body and are in alignment with the circular recess 124 in the spreader device 32. The bores are dimensioned to slidably receive the termination pins 44. Each bore 152 has a recess or counterbore 154' opening at the rear face 150 of the support body. When the spreader device 32 is pressed up against the rear face 150 of the support body by the retaining ring 34, the forward faces of the ring 129 and the circular base 114 of the spreader device, and the bottoms 156 of the counterbores 154' form therebetween annular grooves which are axially aligned with the grooves 54 in the termination pins. As seen in FIG. 1A, the diameter of each O-ring 56 is sufficiently great that the ring extends outwardly beyond the surface of the pin 44 into the groove in the connector body surrounding groove 54. The O-ring is loose in the aligned grooves. The area of the front faces of the ring 129 and base 114 adjacent each counterbore or groove 154' provides a forwardly facing annular shoulder behind the O-ring. The forward wall of the groove 54 in each termination pin provides a rearwardly facing annular shoulder. When the connector members 12a and 12b are mated, the mating end faces of the termination pins axially abut and the O-rings 56 become compressively engaged between the aforementioned shoulders providing a resilient force tending to resist axial rearward movement of the pins in their respective connector bodies. The O-rings provide for axial tolerance relief of the mating end faces of the termination pins and also exert a forwardly directed spring force upon the pins to assure that the mating end faces of the termination pins in the respective connector members 12a and 12b will abut with a slight axial force therebetween. Thus, this arrangement functions in a similar fashion to the axial tolerance relief invention disclosed in my copending application entitled, "Fiber Optic Connector with Axial Tolerance Relief", Ser. No. 597,943, filed July 21, 1975, now U.S. Pat. No. 3,947,182. However, the present arrangement is simpler in construction and requires fewer parts, although it does not permit individual removal of the termination pins from the connector unless the components are disassembled, as illustrated in FIG. 1A.

Figure 8:
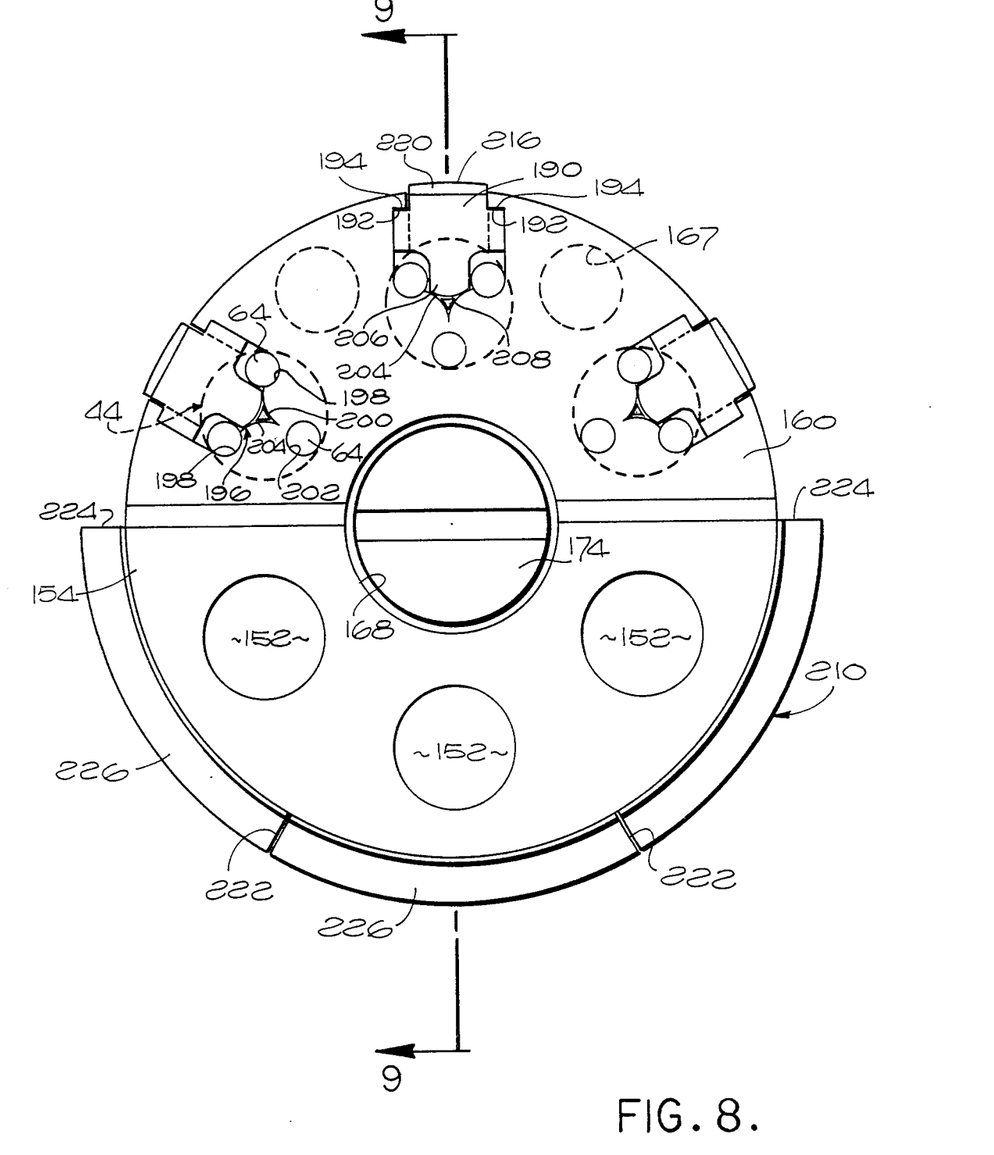
FIG. 8 is a front end view of one of the connector members of the connector illustrated in FIG. 1 with the termination pins being shown only in the upper half of the connector body.
Figure 9:
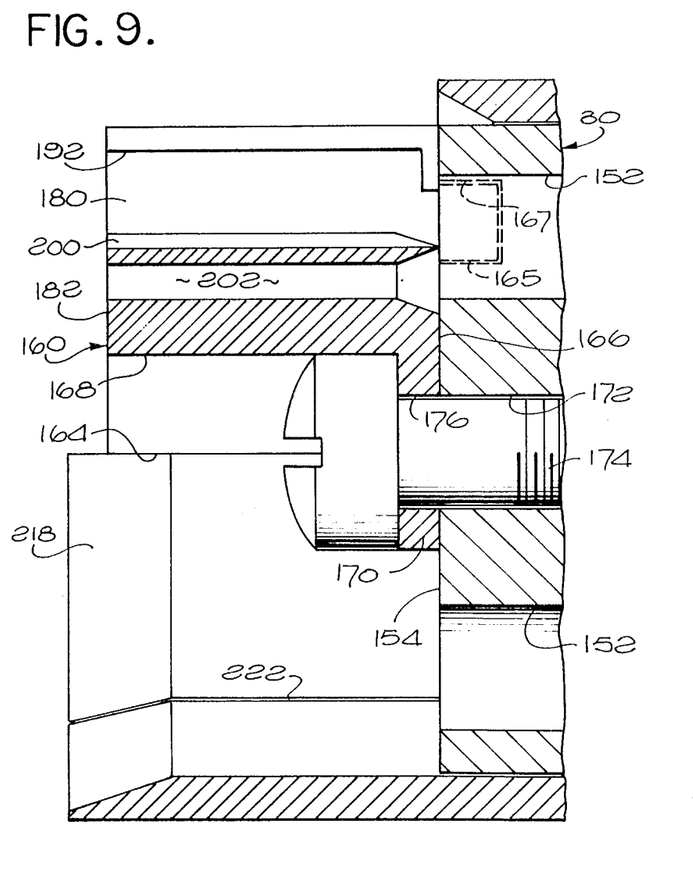
FIG. 9 is a longitudinal sectional view taken along line 9—9 of FIG. 8 with all the termination pins removed from the connector body.

As seen in FIGS. 1A, 8, and 9, a semi-cylindrical plate 160 is removably mounted on one-half of the circular forward face 154 of the support body 30. The diameter of the semi-cylindrical plate 160 is slightly less than the diameter of the forward part of the support body 30 so that the outer cylindrical surface 162 of the plate is spaced inwardly a short distance from the cylindrical surface of the support body, as best seen in FIG. 1. The inner flat surface 164 of the plate 160 is closely adjacent to a longitudinal plane passing through the center axis of the support body 30. A pair of locating pins 165 extend rearwardly from the rear face 166 of the plate 160. The pins extend into two bores 167 in the forward face of the support body 30 for positioning the plate on the body in the manner just described.

A centrally located semi-cylindrical recess 168 is formed in the inner surface 164 of the plate 160. A flange 170 is formed adjacent to the rear face 168 of the plate 160 and extends over a central threaded passage 172 in the support body 30. A screw 174 extends through a hole 176 in the flange 168 and is threaded into the bore 172 to removably secure the plate 160 on the forward face of the support body.

The plate 160 contains three longitudinally extending passages, 180 extending from the rear face 166 to the front face 182 of the plate. The passages are aligned with the three bores 152 in the support body 30 underlying the plate 160. The forward ends of the termination pins in such bores 152 extend forwardly from the forward face 154 of the support body into the passages 180, with the mating end faces of the pins terminating intermediate the front face 182 and rear face 166 of the plate 160. Thus, the termination pins in the plate 160 are shrouded and protected from damage. The three termination pins in the bores 152 in the other half of the support body 30 extend outwardly from the forward face 154 thereof the same distance as do the termination pins that extend into the passages 180. When the connector members 12a and 12b are rotationally positioned relative to each other 180° out of phase (so that the semi-cylindrical plates 160 are out of alignment), the exposed termination pins in the one-half of each connector support body will slidably engage into the passages 180 in the semi-cylindrical plate 160 on the other connector member support body to make a butting engagement therewith intermediate the ends of the passages 180. Since the plates 160 are mounted on their respective support bodies 30 by screws 174, the plates may be removed to permit cleaning of the end faces of the terminations pins 44. It will be appreciated that by the foregoing arrangement of the terminations pins, and the mounting of half of the pins in a removable semi-cylindrical plate, the two identical connector members of the present invention provide a hermaphroditic connector assembly so that identical connector members may be attached to opposite ends of a fiber optic cable, and connection may be made at each end of the cable to a mating connector member without having to reverse the direction of the cable.

It will be appreciated that due to tolerances in the various parts in the connector assembly, the mating termination pins in the connector members are only generally axially aligned therein. The keys 52 on the termination pins engaging the keyways 126 in the spreader device 132 serve to generally rotationally align the termination pins so that the indentations 80 in the crimped eyelets 68 are longitudinally aligned in the passages 180 in the plates 160. An important feature of the invention is the providing of means for accurately aligning the indentations in the mating eyelets so that the light transmitting fiber cores therein will be axially aligned. Accurate alignment of the fiber cores can be achieved since the alignment means of the present invention locates off the indentations in the eyelets, which are extremely close to the fiber cores. It is desirable in order to achieve precise axial alignment of the fiber cores that not only accurate longitudinal alignment be achieved between the indentations in the eyelets of the mating termination pins, but also that the indentations be compressed radially inwardly toward the cores. This is because after an eyelet is deformed by the crimp tool 92, the metal of the deformed eyelet elastically recovers somewhat, leaving a greater than desired space between the wall of the eyelet and the fiber core. Furthermore, the crimping of the eyelet about the fiber core compresses the plastic cladding of the optical fiber. The compressed cladding exerts a force on the crimped eyelet thereby forcing the indented walls of the eyelet radially outwardly. In the preferred emmbodiment of the invention, to achieve precise alignment of the mating fiber cores, cam followers 190 are mounted in the passages 180 in removable plate 160. One cam follower is shown removed from its respective passage 180 in the connector member 12b illustrated in FIG. 1a so that the position of the termination pin 44 in the passage may be clearly seen. Referring to FIGS. 8 and 9, it is noted that each passage 180 in plate 160 extends radially outwardly and opens at the outer cylindrical surface 162 of the plate. The opposite sides of the passage are formed with longitudinally extending inwardly facing shoulders 192. The cam follower 190 is formed with longitudinally extending outwardly facing shoulders 194 which engage the shoulders 192 and thereby prevent removal of the cam followers 190 radially from the passages 180. The cam followers are mounted longitudinally into the passages from the front face 182 of the plate 160.

The inner end 196 of the passage 180 is formed with a pair of spaced, curved longitudinally extending channels 198, which receive two of the cylindrical posts 64 of the termination pin 44. A radially inwardly, extending longitudinal slot 200 is located in the inner end 196 of passage 180 intermediate the curved channels 198. A longitudinally extending bore 202 extends from the front face 182 to the rear face 166 of the plate 160 radially inwardly from the slot 200. The third post 64 of the termination pin 44 is slidably received in the bore 202. Rounded edges 204 are provided between the sides of the slot 200 and the curved channels 198. The curvature of the edges 204 corresponds to the curvature of the curved indentations 80 in the eyelet 68 on the termination pin 44. The slot 200 is dimensioned to slidably receive one of the ribs 82 of the eyelet. Thus, the edges 204 provides stationary tool for deforming two indentations 80 of the eyelet inwardly toward the fiber core therein when the eyelet is forced radially inwardly.

The inner end of the cam follower 190 is formed with a longitudinally extending ridge 206 having an inner curved surface 208 of arcuate convex configuration complementary to the curvature of the indentation 80 of the eyelet 68. The ridge 206 is sufficiently narrow that it may pass between the posts 64 of the termination pin lying in the channels 198. It is noted that the rounded edges 204 and the ridge 206 on the cam follower 90 extend to the opposite end faces of the plate 180 and hence, on opposite sides of the point of abutment of the mating end faces of the two termination pins in the passage 180. It will be appreciated that when a radially inwardly directed force is applied to the cam follower 190, the ridge 206 on the inner end of the follower and the rounded edges 204 on the bottom of the passage 180 in plate 160 will function in a similar manner as the jaws 110 in the crimp tool 92 illustrated in FIG. 7. That is, the cam follower and ridges 206 will apply positive radially inwardly directed force upon the generally aligned indentations 80 in the mating eyelets positioned in the passage 180 thereby locating the indentations in closer proximity to the fiber cores to overcome any expansion of the wall of the eyelets due to elastic recovery of the metal or the compression of the plastic cladding of the optical fiber after original crimping of the eyelet by the tool 92. Since the locating points for alignment of the mating eyelets are extremely close to the light transmitting fiber cores therein, highly accurate, controlled axial alignment of the cores is achieved by the present invention.

Figure 10:
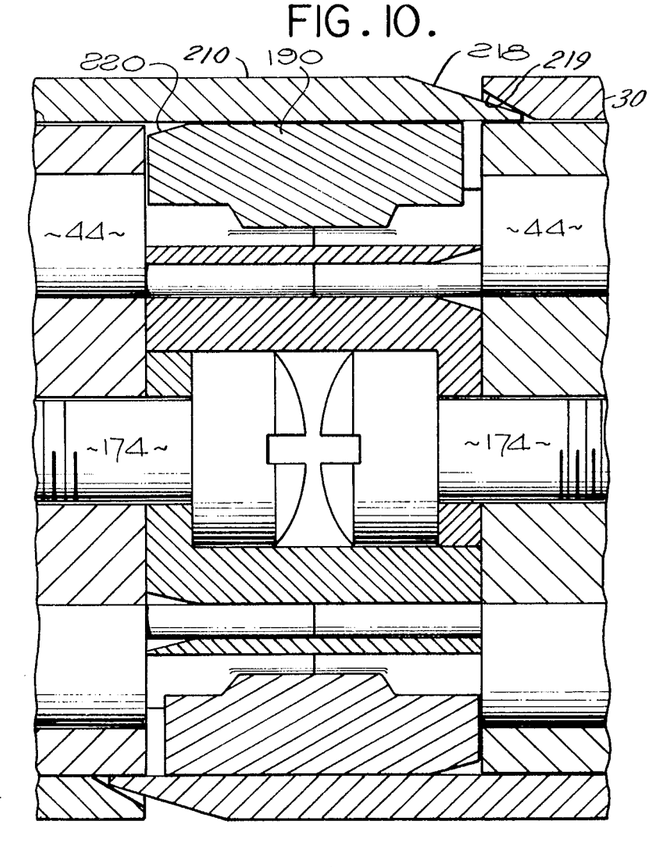
FIG. 10 is a longitudinal sectional view similar to FIG. 9 but showing the front ends of the internal components of the mating connecting members fully engaged with the mating termination pins in abutting engagement.

Any suitable means may be utilized for camming the cam followers 190 radially inwardly in the passage 180 to achieve axial alignment of the optical fibers in mating termination pins mounted. Preferably, such means comprises a semi-cylindrical forwardly extending wall 210 on the forward face 154 of the support body 30 opposite to the plate 160. The wall 210 and the inner surface 164 of the plate 160 define a semi-cylindrical recess 212 which is dimensioned to slidably receive thereinto the semi-cylindrical plate 160 on the mating connector member. The inner surface 214 of the wall 210 slides over the outer cylindrical surface 162 of the mating connector member when the two connector members 12a and 12b are interengaged, and engages the outer curved surfaces 216 of the cam followers 190 which extend beyond the outer cylindrical surface 162 of plate 160. Preferably a chamfer 218 is formed on the outer forward surface of the semi-cylindrical wall 210. As seen in FIG. 10, an internal chamfer 219 is formed on the forward end of the support body 30. This chamfer cooperates with the external chamfer 218 on the wall 210 camming the wall inwardly when the mating connector members are pushed axially together upon interengagement. The forward outer surfaces of the cam followers 190 are chamfered as indicated at 220. The chamfered surfaces 220 facilitate the sliding of the semi-cylindrical wall 210 on one connector member over the outer surfaces of the cam followers 190 in the mating connector member. Preferably, two longitudinally extending slots 222 are formed in each wall 210 offset about 60° from each other and from the side edges 224 of the wall, thereby providing three individual arcuate wall sections 226 for independently engaging the three cam followers 190 on the mating connector member.

Reference is made to FIG. 10 of the drawings which illustrates the front ends of the connector bodies of the two connector members 12a and 12b when the latter are fully interengaged by the coupling rings 18. FIG. 10 clearly illustrates the hermaphroditic arrangement of the present invention which allows two identical connector members to be coupled to opposite ends of a fiber optic cable. In FIG. 10, the cam followers 190 in the respective connector members are shown forced radially inwardly by the semicylindrical forwardly extending walls 210 thereby achieving accurate axial alignment between the mating optical fibers in the connector members.

Figures 11, 12:
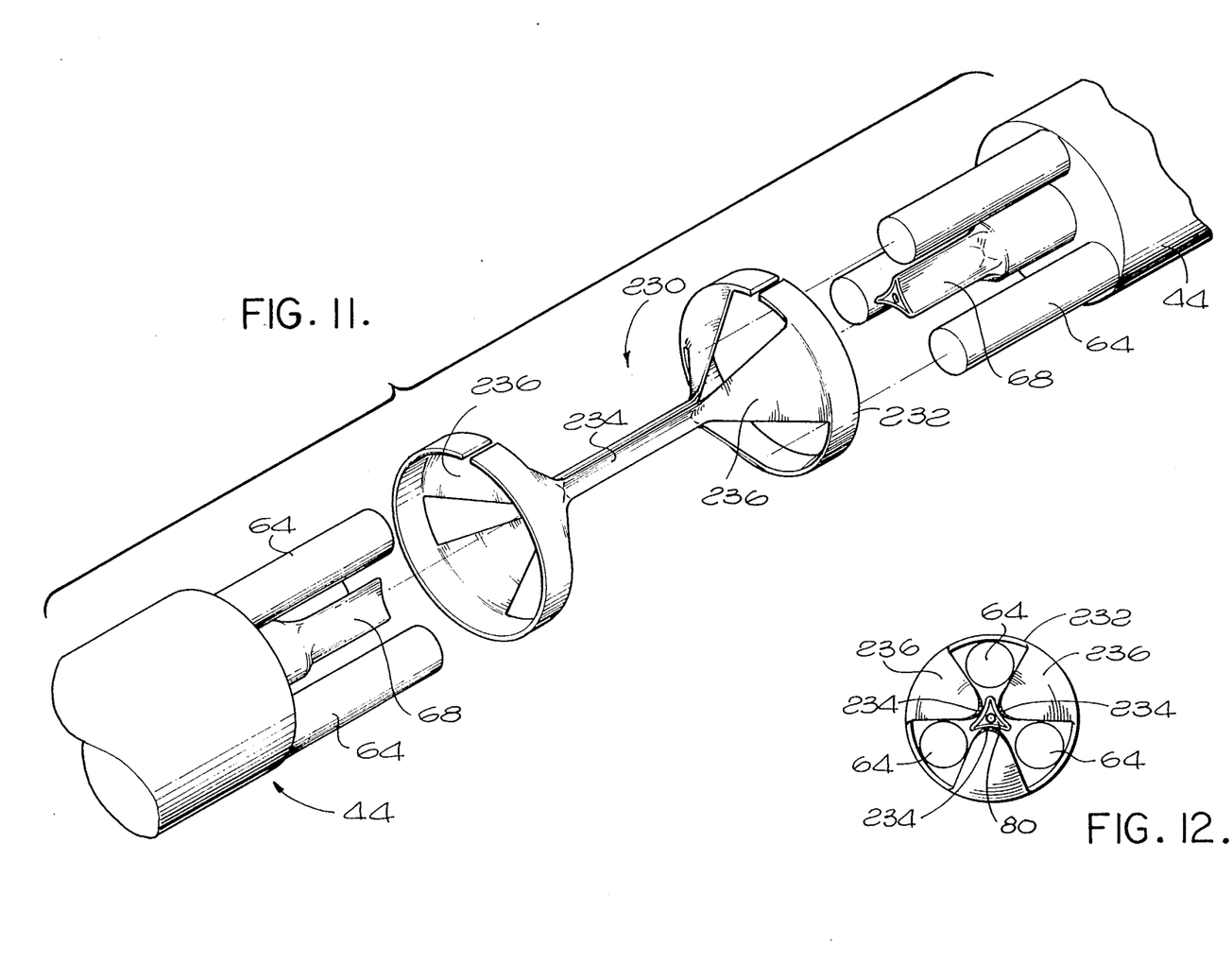
FIG. 11 is an exploded perspective view of a pair of termination pins and a spring alignment device therefor in accordance with an alternative embodiment of the invention.
FIG. 12 is a transverse sectional view through the spring alignment device illustrated in FIG. 11 with the termination pins mounted therein in axial alignment.

Reference is now made to FIGS. 11 and 12 of the drawings which illustrate a spring alignment device, generally designated 230, which may be employed for axially aligning the optical fibers in a pair of mating termination pins 44. The device 230 has a generally cylindrical configuration and comprises a pair of circular end rings 232 and three longitudinally extending resilient members 234, each of which is joined at its opposite ends to the ring members 232 by generally radially extending webs 236. The resilient members 234 are offset 120° from each other and are dimensioned to engage within the indentations 80 of the eyelets 68 on the termination pins 44 when the pins are mounted in opposite ends of the device 230 and abut intermediate the rings 232. The device 230 may be mounted in a cylindrical passage located in the same place where a passage 180 is formed in the removable semi-cylindrical plate 160 in the connector illustrated in FIGS. 1 to 10. The spring device 230 is designed so that when a pair of mating termination pins extend into opposite ends of the device, the resilient members 234 will be located between the posts 64 and will exert a radially inwardly directed spring force on the indentations 80 in the eyelets 68 thereby simultaneously deforming the walls of the eyelets at the indentations and longitudinally aligning the indentations to achieve axial alignment of the fiber optic cores in the eyelets. It will be appreciated that the spring device 230 may be inexpensively made by stamping the same from a flat sheet of spring metal and forming the stamped piece into a cylindrical configuration. The device 230 is less expensive than the alignment arrangement embodied in the first embodiment of the invention disclosed herein, but is incapable of producing as much deformation of the indented wall sections of the termination pin eyelets as the positive camming arrangement of the first embodiment.

It will be appreciated from the foregoing that by the present invention there is provided a hermaphroditic fiber optic connector for single optical fibers. The connector provides total support for the individual optical fibers so that the fibers will not break or vibrate when the connector is used. The connector may be utilized with any form of single optical fiber, including optical fiber cores clad with plastic or without plastic. If the core is not clad with plastic, preferably the interstice of the eyelet 68 is filled with a suitable epoxy or cement after the eyelet has been crimped to completely support the core during the polishing of the end face of the termination pin and to mechanically support it against vibration, etc. The connector of the present invention has a high mating cycle life. The optical surfaces may be readily cleaned by removing the semi-cylindrical plates 160 on the end faces of the support bodies in the connector members. Furthermore, the termination pins 44 may be readily mounted on optical fibers without the requirement of expensive or complex tools, special processes, or skilled labor. Thus, the connector is completely field serviceable, thereby making it particularly suitable for commercial field use.

Most important, the present invention provides a controlled precise alignment of single optical fibers. By way of example only, a connector as illustrated in FIGS. 1 to 10 may be manufactured which, when utilized for coupling a pair of identical 5 mil core plastic clad silica fibers, produces a maximum lateral offset of only 0.2 mils, causing a light transmission loss of only 0.1 to 0.3 dB due to lateral misalignment. Considering also light transmission losses resulting from the axial gap between the mating end faces of the fibers and Fresnel reflection losses, the total light transmission loss between the aforementioned 5 mil core fibers in the connector of the present invention would be only about 0.6 dB. Such a loss is indeed minimal for a commercially practical, field serviceable connector assembly capable of interconnecting a plurality of single optical fibers.

What is claimed is:

1. A single optical fiber termination pin comprising:
    a hollow ferrule having a bore therethrough for receiving an optical fiber;
    an eyelet on the forward end of said ferrule coaxial with said bore, said eyelet being formed of a readily deformable material so that the wall thereof is capable of being deformed inwardly toward said fiber;
    said ferrule having three forwardly extending posts thereon generally equally spaced circumferentially about said eyelet; and
    said posts and eyelet terminating in forward ends generally lying in a common plane perpendicular to the axis of said ferrule.

2. A termination pin terminated to a single optical fiber comprising:
    a hollow ferrule having a bore therethrough receiving said fiber;
    an eyelet on the forward end of said ferrule coaxial with said bore, said eyelet having a mating end face;
    the wall of said eyelet adjacent to said end face embodying three circumferentially spaced indentations each disposed in juxtaposition to said fiber centrally locating said fiber in said eyelet;
    said indentations in said eyelet defining three radially outwardly extending ribs;
    said ferrule having three forwardly extending posts each positioned adjacent to the end of one of said ribs so as to be out of radial alignment with said indentations; and
    said posts terminating in forward ends coplanar with said mating end face of said eyelet.

3. A termination pin as set forth in claim 2 wherein:
    said ferrule is formed of plastic; and
    said eyelet is formed of metal and is crimped onto said fiber.

4. A fiber optic connector for coupling a pair of single optical fibers comprising:
    a pair of mating connector members each containing a single optical fiber terminated by a termination pin and aligned with the termination pin in the other connector member when mated therewith;
    each said termination pin comprising an eyelet surrounding its respective optical fiber and having a mating end face adapted to abut the end face of the eyelet of the mating aligned termination pin;
    the wall of said eyelet adjacent to said end face embodying three circumferentially spaced indentations each disposed in juxtaposition to said fiber;
    means locating said termination pins in said connector members so that the indentations in said eyelets are generally aligned when said connector members are mated thereby providing three pairs of aligned indentations; and
    means for effecting accurate lateral alignment between said eyelets when said connector members are mated, said alignment means extending to opposite sides of the point of abutment of said eyelets and embodying three elements each of which extends into one pair of aligned indentations in said eyelets.

5. A fiber optic connector as set forth in claim 1 wherein:
    said elements of each alignment means exert radially inwardly directed forces into the bottoms of said indentations of said eyelets.

6. A fiber optic connector as set forth in claim 5 wherein:
said elements exert forces sufficient to deform the bottoms of said indentations of each said eyelet inwardly toward the optical fiber therein.

7. A fiber optic connector as set forth in claim 5 wherein:
said elements comprise resilient members exerting radially inwardly directed spring forces on said bottoms of said indentations.

8. A fiber optic connector as set forth in claim 5 wherein:
one of said elements comprises a cam follower positioned in one pair of aligned indentations, the other two elements are stationary; and
said alignment means also includes cam means for shifting said cam follower inwardly toward the bottom of said one pair of indentations to produce a positive force acting upon all three pairs of aligned indentations.

9. A fiber optic connector as set forth in claim 8 wherein:
said cam follower is mounted on one of said connector members; and
said cam means is mounted on the other connector member, said cam means operating to actuate said cam follower upon mating of said connector members.

10. A fiber optic connector as set forth in claim 9 wherein:
said one connector member comprises a support body having an outer surface and a forward face;
a passage in said body extends rearwardly from said forward face and opens at said outer surface;
said one connector member termination pin eyelet extends forwardly into said passage but terminates short of said forward face, the termination pin eyelet in said other connector member being slidable into the forward end of said passage to mate with said one connector member eyelet;
said cam follower is mounted in said passage and has an inner surface adjacent to the bottom of said one pair of aligned indentations in said eyelets in said passage; and
said cam means engages the outer surface of said cam follower.

11. A fiber optic connector as set forth in claim 10 wherein:
said cam follower extends outwardly beyond the outer surface of said support body prior to mating of said connector members; and
said cam means comprises a forwardly extending wall slidable over said outer surface and having an inner surface engaging said outer surface of said cam follower.

12. A fiber optic connector as set forth in claim 4 wherein:
said connector members are hermaphroditic;
each said connector member comprises a cylindrical support body having a forward face;
a semi-cylindrical plate removably mounted on one-half of said forward face, said plate having a front face and a rear face;
a pair of bores in said support body extending rearwardly from said forward face, one of said bores opening at said one-half of said forward face and the other bore opening at the other half of said forward face, the bores in the respective support bodies in said connector members being aligned when said connector members are mated;
a passage extending through said plate from said front face to said rear face and aligned with said one bore;
a pair of said termination pins;
one of said termination pins being mounted in said one bore with its eyelet extending forwardly into said passage but terminating short of said front face; and
the other of said termination pins being mounted in said other bore and extending forwardly of said forward face a distance sufficient to mate with the eyelet in the removable plate passage in the mating connector member.

13. A fiber optic connector as set forth in claim 12 wherein:
said passage opens at the outer cylindrical surface of said semi-cylindrical plate;
one of said elements of said alignment means comprises a cam follower lying in said passage, said cam follower having an inner end and an outer end, said inner end being positioned in one pair of aligned indentations of the eyelet disposed in said passage;
said plate having stationary edges therein adjacent to the inner end of said passage forming the other of said elements which extend into the other two pairs of indentations of said eyelets; and
said alignment means includes cam means on each connector member for shifting the cam follower in the other connector member radially inwardly to produce a positive force upon all three pairs of aligned indentations, said cam means operating to actuate said cam follower when said connector members are mated.

14. A fiber optic connector as set forth in claim 13 wherein:
said cam means on each connector member comprises a generally semi-cylindrical forwardly extending wall on said other half of said forward face adjacent to the periphery of said cylindrical support body, said wall and plate defining therebetween a semi-cylindrical recess dimensioned to slidably receive thereinto the semi-cylindrical plate on the mating connector member.

15. A fiber optic connector as set forth in claim 14 wherein:
the inner surface of said semi-cylindrical wall engages the outer end of said cam follower.

16. A fiber optic connector as set forth in claim 15 wherein:
said outer end of said cam follower extends beyond the outer cylindrical surface of said plate prior to mating of said connector members.

17. A fiber optic connector as set forth in claim 15 including:
a plurality of said passages in said plate each receiving a pair of said eyelets and containing one of said cam followers; and
said semi-cylindrical wall engages the outer end of each of said cam followers.

18. A fiber optic connector as set forth in claim 17 wherein:
said semi-cylindrical wall has longitudinally extending slots therein between said cam followers thereby defining an individual accurate wall section for camming each of said cam followers independently.

19. A fiber optic connector as set forth in claim 13 wherein:
said three indentations in each said eyelet defines three radially outwardly extending ribs;
said plate has a slot therein extending radially inwardly from the inner end of said passage and receiving two aligned ribs of the eyelets in said passage; and
said stationary edges being formed by the sides of said slot and the inner end of said passage.

20. A fiber optic connector as set forth in claim 4 wherein:
each said termination pin includes three forwardly extending posts spaced circumferentially about said eyelet out of radial alignment with said indentations; and
said posts terminating in forward ends coplanar with the mating end face of said eyelet.

21. A fiber optic connector as set forth in claim 20 wherein:
said termination pin comprises a plastic ferrule having a central passage therethrough receiving said optical fiber, said eyelet being formed of metal and mounted on the front end of said ferrule coaxial with said passage; and
said posts being integral with said ferrule.

22. A fiber optic connector as set forth in claim 4 for coupling a pair of fiber optic cables each having a strength member and a plurality of said single optical fibers therein wherein:
one of said termination pins terminates each of said single optical fibers;
each said connector member has a cylindrical support body formed with a circular array of longitudinally extending bores therein each receiving one of said termination pins;
a conical fiber spreader device at the rear of each said support body with the circular base thereof adjacent to said body and the apex thereof extending rearwardly from said body;
a plurality of grooves in the outer surface of said spreader device each aligned with one of said bores and receiving therein an optical fiber; and
means surrounding said spreader for retaining said fibers in said grooves.

23. A fiber optic connector as set forth in claim 22 including:
a longitudinally extending passage in said spreader receiving said cable strength member.

24. A fiber optic connector as set forth in claim 23 wherein:
said passage is coaxial with the center of said circular base and opens at said apex.

25. A hermaphroditic optic connector for coupling single optical fibers each terminated by a termination pin comprising:
a pair of mating connector members;
each said connector member comprising a cylindrical support body having a forward face;
a semi-cylindrical plate removably mounted on one-half of said forward face of each said support body, said plate having a front face and a rear face;
said connector members being rotated 180° out of phase with respect to each other when mated so that said semi-cylindrical plates nest together to form a cylinder with the front face of each said plate facing the other half of the forward face of the cylindrical support of the other connector member;
a pair of bores in each said support body extending rearwardly from said forward face, one of said bores opening at said one-half of said forward face and the other bore opening at said other half of said forward face, the bores in the respective support bodies in said connector members being aligned when said connector members are mated;
a passage extending through each said plate from said front face to said rear face thereof and aligned with said one bore in the support body on which said plate is mounted;
means for positioning one of said termination pins in said one bore in each said connector member so that its forward end extends forwardly into said passage of the plate of said connector member but terminates short of said front face of said plate; and
means for positioning another termination pin in said other bore in each said connector member so that its forward end extends forwardly of said forward face of the support body of the connector member a distance sufficient to enter into the removable plate passage in the mating connector member.

26. A fiber optic connector as set forth in claim 25 including:
means for laterally aligning said termination pins in each said passage when said connector members are mated.

27. A fiber optic connector as set forth in claim 26 wherein:
said passage opens at the cylindrical surface of said plate; and
said aligning means comprises a cam follower in each of said passage of each connector member, said cam follower having an outer surface adjacent to the cylindrical surface of said plate, and cam means on each connector member engaging the outer surface of the cam follower in the other connector member forcing said cam follower inwardly in said passage.

28. A fiber optic connector for coupling a pair of single optical fibers each terminated by a termination pin having a mating end face comprising:
a pair of mating connector members each adapted to mount one of said termination pins, one of said connector members having a front face and a passage therein opening at said front face, said passage being adapted to receive said termination pins thereinto from its opposite ends for abutment at their mating end faces; and
means for effecting accurate lateral alignment of the termination pins at their point of abutment, said alignment means including a cam follower in said passage extending to opposite sides of said point of abutment, and cam means for shifting said cam follower toward one side of said passage for applying a positive aligning force to said pins adapted to be positioned between said cam follower and said one side of said passage.

29. A fiber optic connector as set forth in claim 28 wherein:
said cam means is mounted on the other connector member, said cam means operating to actuate said cam follower upon mating of said connector members.

30. A fiber optic connector as set forth in claim 29 wherein:
  said one connector member has an outer surface;
  the side of said passage opposite to said one side opens at said outer surface;
  said cam follower has an inner surface adjacent to said one side of said passage and an outer surface; and
  said cam means engages said outer surface of said cam follower.

31. A fiber optic connector as set forth in claim 30 wherein:
  said cam follower extends outwardly beyond the outer surface of said one connector member prior to mating of said connector members; and
  said cam means comprises a forwardly extending wall slidable over said outer surface and having an inner surface engaging said outer surface of said cam follower.

32. A fiber optic connector as set forth in claim 30 wherein:
  said inner surface of said cam follower has an arcuate convex configuration; and
  a longitudinally extending slot is formed in said one side of said passage.

33. In a fiber optic cable connector, a device for effecting lateral alignment of a pair of abutting fiber optic cable termination pins in light transmission relationship, comprising:
  an elongated, generally tubular, relatively thin-walled hollow member having a mid-region and two end portions, said mid-region having a cross-section less than that of said end portions, said end portions being each sized to receive a corresponding one of said pins, said pins being inserted therein and abutting within said mid-region;
  termination pin alignment means comprising a plurality of resilient, radially, inwardly formed wall portions within said mid-region of said member defining a restricted bore therein, said wall portions being uniformly circumferentially spaced from each other, the transverse cross-sections of said pins in said mid-region and the cross-section of said restricted bore being selected such that when said pins are inserted in said restricted bore, said inwardly formed wall portions will substantially exert the same balanced resilient, radially inward forces against said pins, at least at the location of said abutting, causing said pins to be precisely laterally aligned; and
  the inner surfaces of said inwardly formed wall portions each having an arcuately convex configuration in cross-section transverse of the longitudinal axis of said member defining thereby a restricted bore of cuspid configuration.

34. A connector as set forth in claim 33 wherein:
said hollow member is formed of stamped sheet metal rolled into tubular configuration.

35. A device as set forth in claim 33 wherein:
said ends of said hollow member comprise circular end rings; and
said inwardly projecting portions comprise longitudinally extending resilient strips joined to said end rings by generally radially outwardly extending webs at the respective ends of said strips.

* * * * *